United States Patent
Stancu et al.

(10) Patent No.: US 6,504,329 B2
(45) Date of Patent: Jan. 7, 2003

(54) APPARATUS AND METHOD FOR CONTROLLING PERMANENT MAGNET ELECTRIC MACHINES

(75) Inventors: Constantin C. Stancu, Anaheim, CA (US); Silva Hiti, Torrance, CA (US); James M. Nagashima, Cerritos, CA (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/829,106

(22) Filed: Apr. 9, 2001

(65) Prior Publication Data

US 2002/0171387 A1 Nov. 21, 2002

(51) Int. Cl.$^7$ .................................................. H02P 7/06
(52) U.S. Cl. ........................ 318/254; 318/138; 318/439; 318/721; 318/825
(58) Field of Search ................................. 318/715, 721, 318/799, 801, 823, 825, 727, 254, 138, 439

(56) References Cited

U.S. PATENT DOCUMENTS

| | | | | |
|---|---|---|---|---|
| 3,862,856 A | * | 1/1975 | Shipman | 117/201 |
| 4,916,368 A | * | 4/1990 | Onoda et al. | 318/723 |
| 5,504,404 A | * | 4/1996 | Tamaki et al. | 318/432 |
| 5,656,911 A | * | 8/1997 | Nakayama et al. | 318/718 |
| 5,739,664 A | * | 4/1998 | Deng et al. | 318/808 |
| 6,002,234 A | * | 12/1999 | Ohm et al. | 318/729 |
| 6,163,128 A | * | 12/2000 | Hiti et al. | 318/722 |
| 6,288,515 B1 | * | 9/2001 | Hiti et al. | 318/722 |
| 6,304,052 B1 | * | 10/2001 | O'Meara et al. | 318/700 |

OTHER PUBLICATIONS

Authors, Dragan S. Maric, Article entitled "Two Improved Flux Weakening Schemes for Surface Mounted Permanent Magnet Sychronous Machine Drives Employing Space Vector Modulation", California Institute of Technology, Department of Electrical Engineering, M/S 136–93, (Dated 1998 IEEE, pp. 508–512).

Authors, CHOI et al., Article entitled "Design of Fast–Response Current Controller Using d–q Axis Cross Coupling: Application to Permanent Magnet Synchronous Motor Drive," *IEEE Transactions on Industrial Electronics*, (Dated Jun. 1998, pp. 522–524, vol. 45, No. 3).

Authors, Sudhoff et al., Article entitled "A Flux–Weakening Strategy for Current–Regulated Surface–Mounted Permanent–Magnet Machine Drives", School of Electrical Engineering, University of Missouri–Rolla, Naval Surface Warfare Center, Annapolis Detachment, Carderock Division, *IEEE Transactions on Energy Conversion*, (Dated Sep. 1995, pp. 431–437, vol. 10, No. 3).

(List continued on next page.)

Primary Examiner—Robert E. Nappi
Assistant Examiner—Rina I. Duda
(74) Attorney, Agent, or Firm—Christopher DeVries (57) ABSTRACT

A control scheme for an surface-mounted permanent-magnet synchronous (SMPMS) drive uses a combination of an open-loop magnetizing current reference calculation and a stabilizing feedback term, which speeds-up the torque transient response. The feedback term increases the stability margin during torque transients by increasing the available voltage margin for current control. The magnetizing current reference calculation takes into account the saturation effects in the SMPMS drive, which occur at peak torque points, and compensates for them. By taking into account saturation effects, stable operation at high speed is achieved, thereby increasing the speed range of the SMPMS drive.

13 Claims, 7 Drawing Sheets

OTHER PUBLICATIONS

Authors, Song et al., Article entitled "A New Robust SPMSM Control to Parameter Variations in Flux Weakening Region", Hyosung Industry Co., Ltd., Dangsan–Dong Yeongdeungpo–Ku, Seoul, Korea, School of Electrical Engineering, Seoul National University (Dated ©1996 IEEE, pp. 1193–1198).

Authors, Maric et al., Article entitled "Robust Flux Weakening Scheme for Surface–Mounted Permanent–Magnet Synchronous Drives Employing an Adaptive Lattice–Structure Filter," California Institute of Technology, Dept. of Electrical Engineering, M/S 136–93 (Dated ©1999, IEEE, pp. 271–276).

* cited by examiner

APPARATUS AND METHOD FOR CONTROLLING PERMANENT MAGNET ELECTRIC MACHINES

FIELD OF THE INVENTION

The present invention relates to control schemes for electric machines, and, more particularly, to an improved control scheme for permanent magnet machines.

BACKGROUND OF THE INVENTION

Due to their distinct characteristics, but also because of improvements in and reduced cost of permanent magnet (PM) technologies, PM machines are being used in an increasing number of applications, such as electrical propulsion systems for vehicles. Some applications, like electrical propulsion, require a wide operating range above the motor base speed, i.e., a wide range of flux weakening operation. Until recently, surface-mounted permanent-magnet synchronous (SMPMS) machines have been considered generally unsuitable for effective, wide-range flux weakening operation and there have been difficulties in achieving stable operation at high speeds.

With SMPMS machines, a known approach to flux weakening operation is to calculate the magnetizing current reference from SMPMS machine equations, with the assumption that all machine parameters are known. Limits for the magnetizing and torque current in the flux weakening region are calculated according to the presumption that an SMPMS machine operates within the voltage or voltage current limits. However, this approach is very sensitive to uncertainties related to the system parameters and does not offer stable performance under all conditions.

Recently published flux weakening schemes by Maric et al., "Two Improved Flux Wakening Schemes for Surface Mounted Permanent Magnet Synchoronous Machine Drives Employing Space Vector Modulation", IEEE IECON, Vol. 1, pp. 508–511, IEEE 1998 (hereinafter "Maric 1998"), "Robust Flux Weakening Scheme for Surface-Mounted Permanent-Magnet Synchronous Drives Employing an Adaptive Lattice-Structure Filter", Conf. Proceedings IEEE APEC'99, pp. 271–276, IEEE 1999 (hereinafter "Maric 1999"), and Sudhoff et al., "A Flux-Weakening Strategy for Current-Regulated Surface-Mounted Permanent-Magnet Machine Drives", IEEE Transactions on Energy Conversion, Vol. 10, No. 3, pp.431–437 IEEE 1995 (hereinafter "Sudhoff"), offer important advantages in that the schemes do not use machine parameters for calculations in the flux weakening region.

The Sudhoff control scheme is used in the flux-weakening operation of an SMPMS drive. The control scheme uses an error in the torque controlling current component to generate the required demagnetizing current. However, the controller relies on the hysteresis-type current controller, which is not suitable for digital implementation. Also, stable operation over a wide speed range is not practicable.

The Maric schemes are based on the Sudhoff scheme, but modified to use the current controllers in the synchronous reference frame. The Maric 1998 control scheme operates in a wide speed range, but requires non-zero torque control error, which is not suitable for torque-controlled drives used in some applications, such as electric/hybrid vehicle applications. Similar to the Sudhoff scheme, the Maric 1998 scheme detects the steady-state error in the torque current regulation, and then uses the error to generate the magnetizing current reference. In contrast, the Maric 1999 scheme uses closed-loop control of the phase voltage magnitude to generate magnetizing current reference for the flux-weakening operation. The Maric 1999 method is relatively robust, without steady state error present the Maric 1998 and Sudhoff schemes. However, it is more computationally complex than the Maric 1998 scheme. Also, the response of the Maric 1999 control algorithm to sudden torque changes is slow, and can even become unstable due to the loss of current control. The Sudhoff and Maric 1998 algorithms have faster transient responses to sudden torque changes, but require constantly present error in the torque current regulation.

Choi et al., "Design of Fast Response Current Controller Using d-q Axis Cross Coupling: Application to Permanent Magnet Synchronous Motor Drive", IEEE Transactions on Industrial Electronics, Vol. 45, No. 3, June 1998, pp. 522–524 (hereinafter "Choi") describes another SMPMS machine control scheme. In the Choi scheme, a term dependent upon the torque controlling current is used to generate a temporary reference for the magnetizing current. Although this control approach can speed-up the torque transients below base speed, no control strategy for the flux weakening is described. Moreover, the Choi control scheme does not provide for drive operation above the base speed.

Accordingly, there exists a need for an improved control scheme for SMPMS machines that offers fast transient responses and a wide operational range of speed.

SUMMARY OF THE INVENTION

It is an advantage of the present invention to provide a machine control scheme that improves drive performance in a wide speed range, and enables SMPMS machines to be used in applications where fast transient response is required, for example, in motor/generator applications for electric or hybrid vehicles.

According to one aspect of the present invention, a control scheme for an SMPMS drive can use a combination of an open-loop magnetizing current reference calculation and a stabilizing feedback term, which speeds-up the torque transient response. The feedback term increases the stability margin during torque transients by increasing the available voltage margin for current control. The magnetizing current reference calculation takes into account the saturation effects in the SMPMS drive, which occur at peak torque points, and compensates for them. By taking into account saturation effects, stable operation at high speed is achieved, thereby increasing the speed range of the SMPMS drive.

DETAILED DESCRIPTION OF THE PRESENTLY PREFERRED EMBODIMENT(S)

To clarify the notation used hereinafter, SMPMS machine equations in a synchronous reference frame, are given:

$$v_d = Ri_d + L_d \frac{di_d}{dt} - \omega_e L_q i_q; \quad (1)$$

$$v_q = Ri_q + L_q \frac{di_q}{dt} + \omega_e L_d i_d + \lambda_m \omega_e; \quad (2)$$

$$T_e = \frac{3}{2}\frac{P}{2}\lambda_m i_q, \quad (3)$$

where R, $L_d$, and $L_q$ are the stator resistance and d-axis and q-axis inductance, $\omega_e$ is the electrical speed of magnetic field, P is the number of poles, $\lambda_m$ is the flux linkage of permanent magnets, $i_d$ is the flux generating component of the stator current, and $i_q$ is the torque generating component of the stator current.

Maximum allowable motor phase voltage and phase current are determined by the inverter and machine ratings and by the DC link voltage $V_{dc}$. The following inequalities have to be satisfied at any instant:

$$v_d^2 + v_q^2 \le V_{max}^2, \quad (4\text{-}a)$$

$$i_d^2 + i_q^2 \le I_{max}^2. \quad (4\text{-}b)$$

In Eq. (4), $V_{max}$ is the maximum available phase voltage amplitude at the fundamental frequency, and $I_{max}$ is the maximum phase current.

Figure 2:
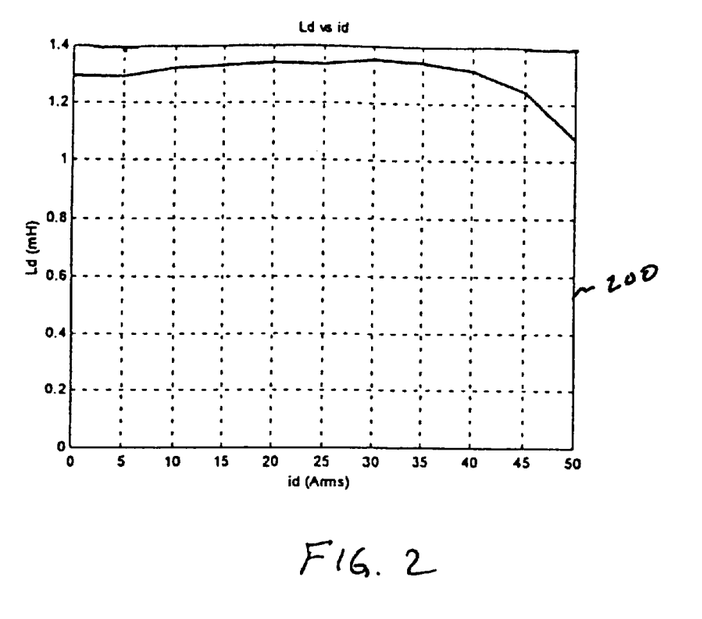
FIG. 2 is a graph showing a d-axis saturation curve for a typical SMPMS machine.
Figure 3:
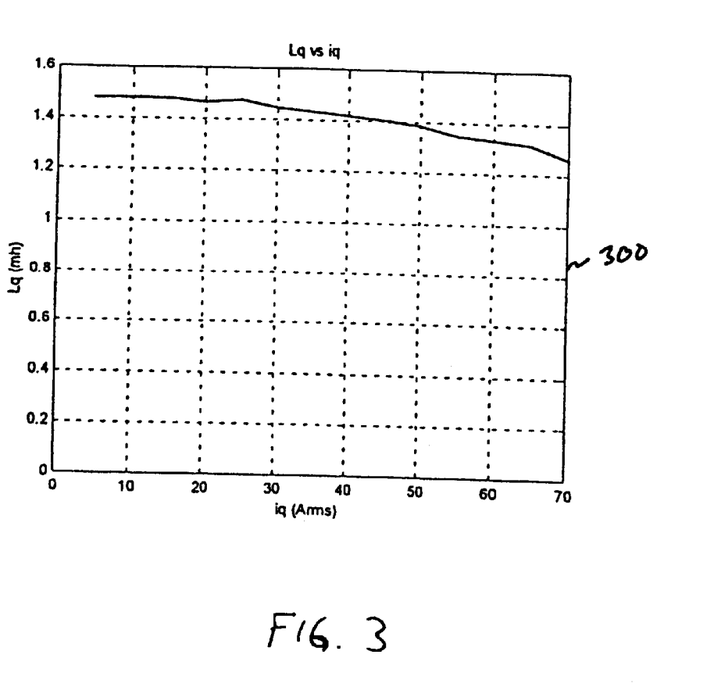
FIG. 3 is a graph showing a q-axis saturation curve for a typical SMPMS machine.

Commonly, SMPMS control strategy at low speeds is chosen to maximize he torque per amp ratio, i.e., $i_d$ is set to zero if back EMF is sufficiently smaller than $V_{max}$ ($\omega_e \lambda_m \ll V_{max}$). Operation above the base speed, $\omega_{base} = V_{max}/\lambda_m$, is enabled by allowing negative $i_d$ current to flow and decrease the total flux in the machine air gap. Above the base speed, the drive operates within the voltage limit. If the effect of the stator resistance is neglected, R=0 in Eqs. (1)–(2), and if equality sign is used in Eq. (4-a), a solution for $i_d^{ref}$ and $i_q^{ref}$, when SMPMS operates within the voltage limit, can be obtained from Eqs. (1)–(4-a), as follows:

$$i_q^{ref} = 1/K_{torque} T^{ref} \quad (5)$$

$$i_d^{ref} = -\frac{\lambda_m}{L_d} + \sqrt{\left(\frac{V_{max}}{\omega_c L_d}\right)^2 - \left(\frac{L_q}{L_d} i_q^{ref}\right)^2}, \quad (6)$$

where $T^{ref}$ is the reference torque value, and is typically obtained from the vehicle controller. Generally, for the SMPMS machine $L_d=L_q$. However, due to saturation effects, at peak torque points it usually holds $L_q/L_d \ge 1$. Typical $L_d$ and $L_q$ saturation curves vs. $i_d$ and $i_q$, respectively are shown in the graphs 200, 300 of FIGS. 2–3.

The solution for SMPMS operating in the voltage and the current limit can be also obtained from Eq. (1)–(4), by using the equality sign in Eqs. (4-a) and (4-b), and is given by:

$$i_d^{ref} = -\lambda_m \frac{L_d}{L_q^2 - L_d^2} + \sqrt{\left(\frac{V_{max}}{\omega_e}\right)^2 \frac{1}{L_q^2 - L_d^2} + I_{max}^2 \frac{L_q^2}{L_q^2 - L_d^2} + \lambda_m^2 \frac{L_q^2}{L_q^2 - L_d^2}} \quad (7)$$

$$i_q^{ref} = \sqrt{I_{max}^2 - \left(i_d^{ref}\right)^2} \quad (8)$$

Figure 4:
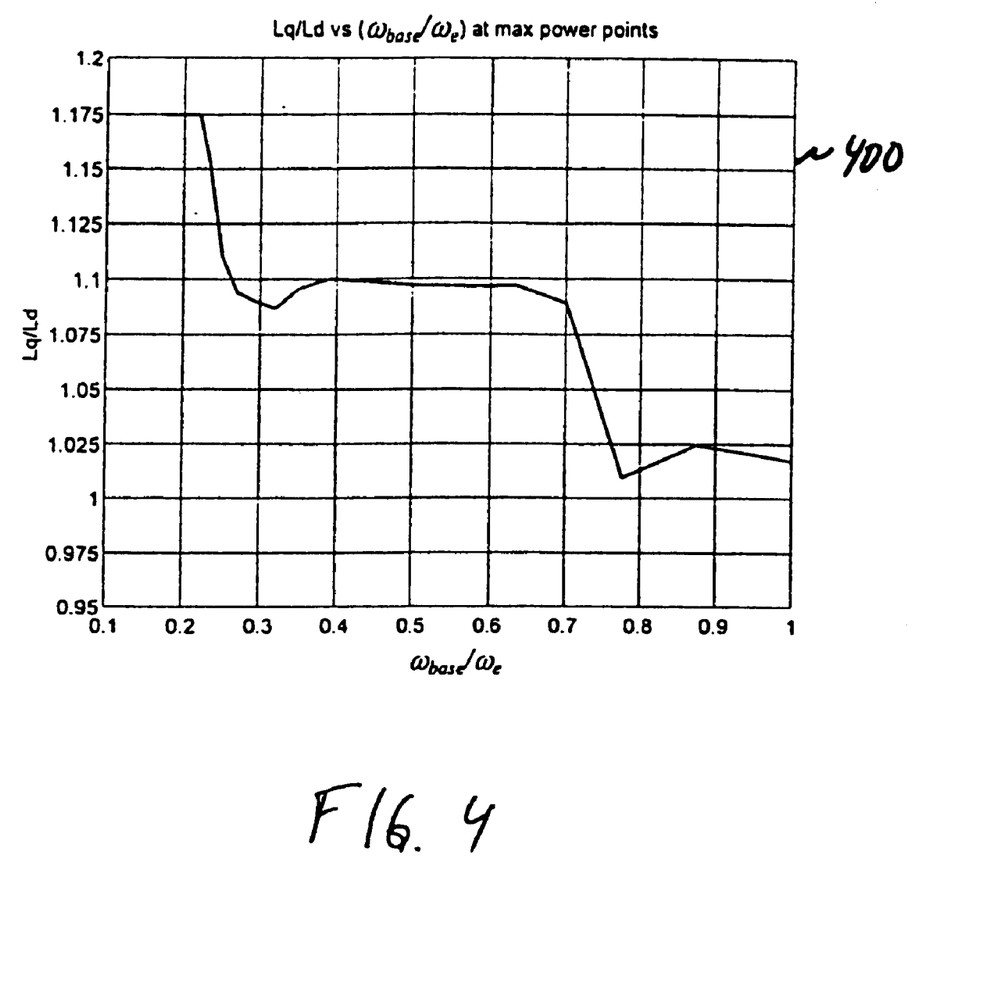
FIG. 4 is a graph showing the ratio $L_q/L_d$ at peak torque points for the typical SMPMS machine characterized by the graphs of FIGS. 2–3.

A graph 400 of the $L_q/L_d$ ratio at peak torque points vs. $\omega_{base}/\omega_e$ is shown in FIG. 4, where $\omega_{base}$ represents the base motor speed and $\omega_e$ represents the actual motor speed. The ratio is calculated from the machine equations taking saturation into account. It can be seen that $L_q/L_d \ge 1$ at practically all peak torque points, effectively increasing the $i_d^{ref}$ when compared to an ideal SMPMS where $L_d = L_q$.

Figure 1:
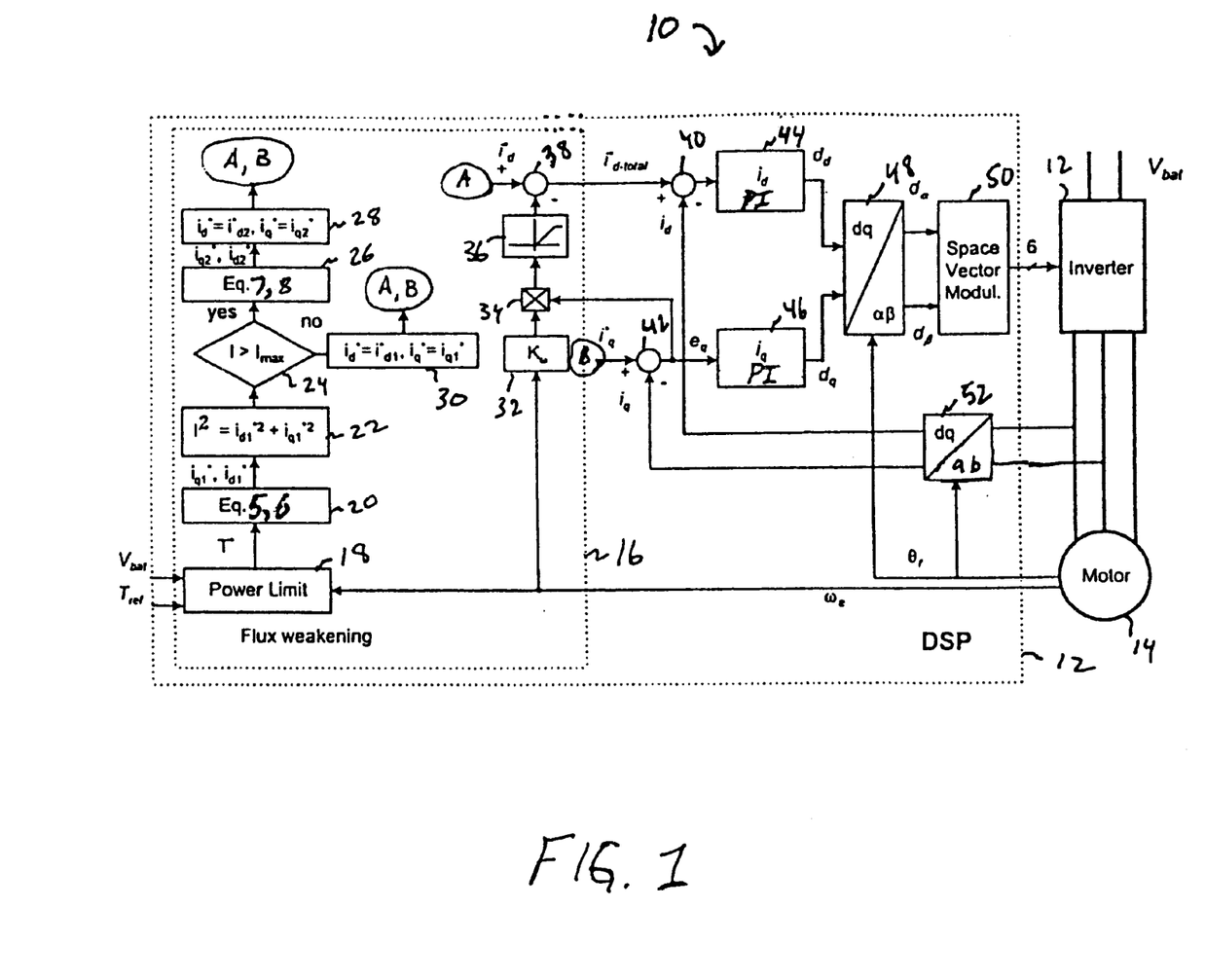
FIG. 1 illustrates a block diagram of an exemplary motor controller in accordance with the present invention.

Turning now to FIG. 1, a control block diagram of an exemplary SMPMS drive 10 in accordance with an embodiment of the present invention is shown. Although the drive 10 can be implemented using various electronic and/or software components, it is preferably implemented using a microprocessor, such as a digital signal processor (DSP) 12 interfaced to a commercially-available inverter 13 and SMPMS motor 14. In this implementation, elements 16–52 of the control block can be software program routines, such as assembly code routines, executable by the DSP 12. The DSP 12 can be any suitable commercially-available DSP, such as part no. ADSP 2171, available from Analog Devices, Inc.

The flux weakening block 16 generates $i_d^{ref}$ and $i_q^{ref}$ references so that constraints given by Eq. (4) are always satisfied. Two controllers 44, 46, such as anti-windup proportional-integral (PI) controllers, in the synchronous reference frame are used for current control, although different types of current controllers can be used as well. A space vector modulator (SVM) 50, with smooth transition from sine wave to a full six-step operation, is employed to generate IGBT gate signals, but other types of pulse width modulation techniques (PWM) can also be employed. The space vector modulator (SVM) reduces IGBT switching losses, while full six-step operation enables maximum DC bus voltage utilization, which is important in applications where it is necessary to maximize the torque available, for example, in electrical propulsion.

In the flux-weakening block 16, the torque reference, $T^{ref}$, is first compared to the maximal torque corresponding to the maximal drive power for the given supply voltage, such as a battery voltage, $V_{bat}$ and synchronous electrical speed $\omega_e$ (step 18). Then, references for the torque and magnetizing currents, $i_q^{ref}$, and $i_d^{ref}$, are calculated from Eqs. (5)–(6), taking into account $L_q/L_d$ vs. speed value shown in FIG. 4 (step 20). This results in values $i_{q1}$ and $i_{d1}*$. In FIG. 1, $i_q^{ref} = i_q*$ and $i_d^{ref} = i_d*$. Next, the sum of the squares for $i_{q1}*$ and $i_{d1}*$ is computed (step 22) and compared to the maximal current squared, $I_{max}^2$ (step 24). If the current limit is satisfied, $i_{q1}*$ and $i_{d1}*$ from Eqs. (5)–(6), are used as references for the current regulators (step 30). If not, Eqs. (7) and (8) are used instead to calculate $i_{q2}*$ and $i_{d2}*$ (step 26) and $i_{q2}*$ and $i_{d2}*$ are used as references for the current regulators (step 28).

A feedback term proportional to $\omega_e(i_q^{ref} - i_q)$, when $\omega_e (i_q^{ref} - i_q) \ge 0$, is subtracted from $i_d^{ref}$ by subtractor 38 to increase the available voltage margin during transients, and therefore speed up the drive response to the sudden reference torque changes. This feedback term provides stable and fast torque transient response, although is practically zero in steady-state operation of the motor 14, i.e., the system does not need the torque current error to produce the magnetizing current reference in steady-state.

The feedback term is generated by a feedback path that includes elements 32–38, 42. The electrical speed feedback signal $\omega_e$ is arithmetically combined with a predetermined constant K, preferably using a multiplication operation (step 32). The optimal value for K was found to be in the range of five to ten for stable operation. Next, the weighted electrical speed signal is multiplied by a torque current error $e_q$ by a multiplier 34. The torque current error is the difference between the torque reference current $i_q^*$ and a feedback torque current $i_q$ from the permanent magnet motor 14.

A limiter 36 is provided for limiting the feedback term to a predetermined range, such as a positive value.

A pair of subtractors 40,42 output the magnetizing and torque current errors, respectively, which are provided to the respective PI controllers 44,46.

The PI controllers can incorporate motor back-emf decoupling terms, gain correction with $V_{batt}$ and anti-windup integrator limiting, as described in Maric 1998.

Coordinate transform routines 48,52 are provided for transforming drive and feedback signals between rotating reference and stationary reference frames.

The motor 14 can be a three-phase SMPMS motor having a 14 kW peak output and capable of operating at 4500 RPM and 900 Hz.

FIGS. 5–8 are signal traces showing the operational results of the exemplary SMPMS motor 14 that is controlled using the scheme of FIG. 1.

Figure 5:
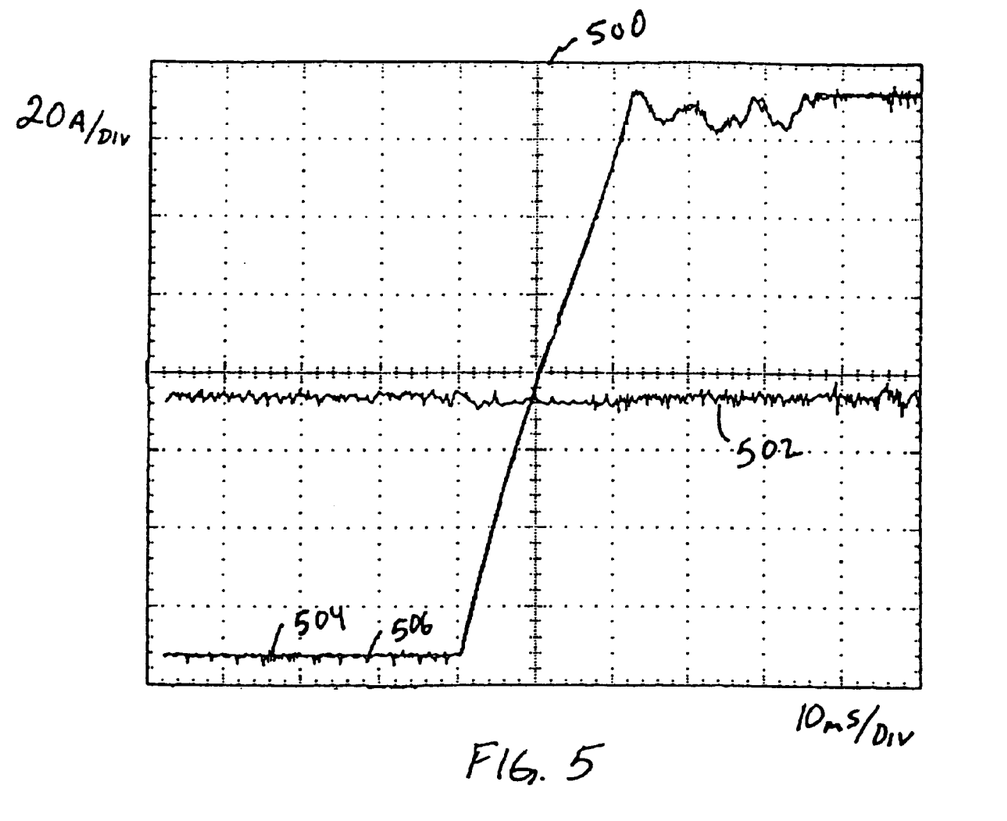
FIGS. 5–8 are signal traces showing the operational results of an exemplary SMPMS motor that is controlled by the motor controller of FIG. 1.

In FIG. 5, a graph 500 is shown for the transient from –100% to 100% torque. The d-axis current is represented by trace 502, while the input torque current command is represented by trace 506, and the actual torque current $i_q$ is represented by trace 504. A slight decrease of the d-axis current can be detected during the transient, which contributes to the temporary reduction of the back e.m.f. of the motor and allows for the rapid change of q-axis current.

Figure 6:
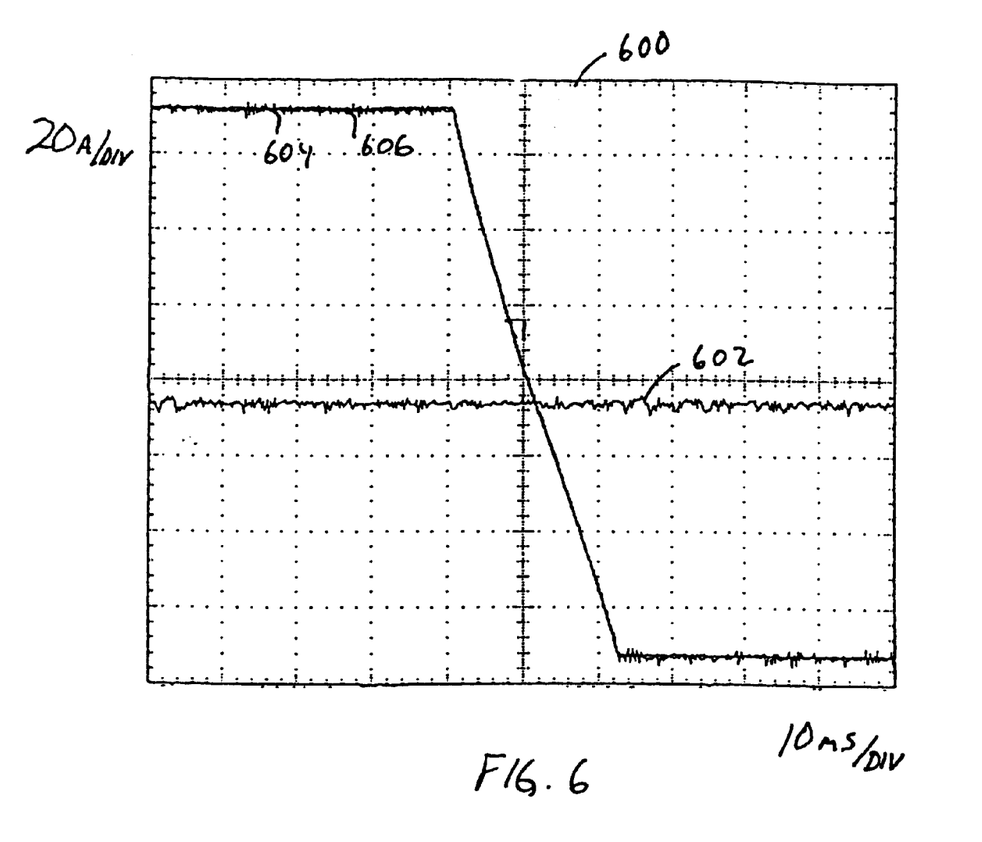

FIG. 6 presents a graph 600 of a similar type of transient, but in the opposite direction from that of FIG. 5, from full motoring to maximum regeneration. The d-axis current is represented by trace 602, while the input torque current command is represented by trace 606 and the actual torque current $i_q$ is represented by trace 604.

Figure 7:
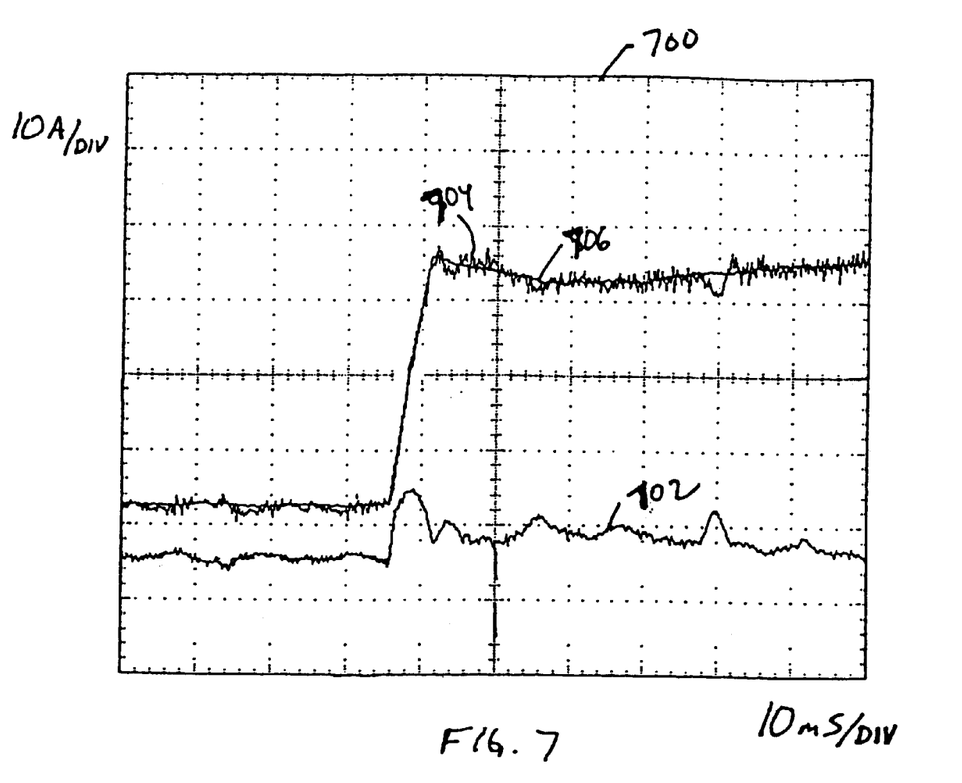
Figure 8:
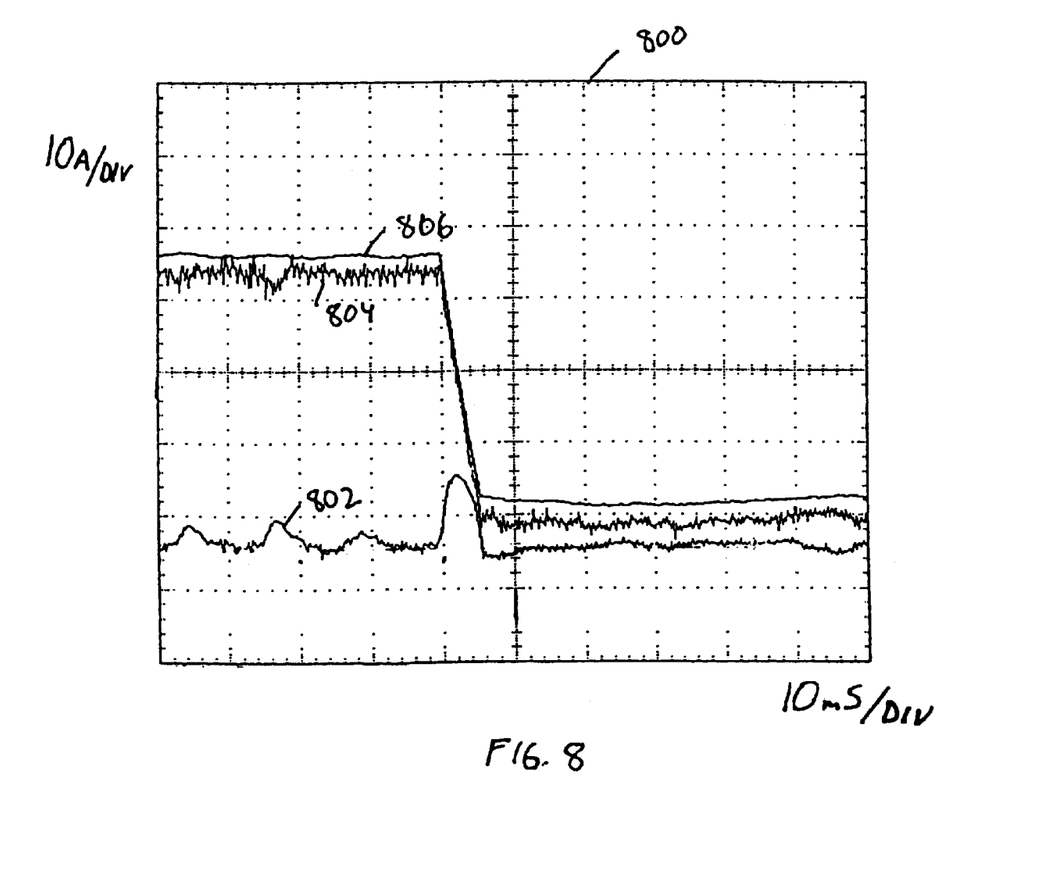

FIGS. 7–8 are graphs 700,800 that present torque transient operation above base speed (at 3500 rpm, 250 Vdc), where the control voltage margin is greatly reduced. In these graphs 700,800 the d-axis current is represented by traces 702,802, while the input torque current command is represented by traces 706,806, and the actual torque current $i_q$ is represented by traces 704,804. The fast transitions between operation modes, with no overshoot, confirm the validity of the control strategy implemented by the drive 10 of FIG. 1.

It should be appreciated that the embodiments described above are to be considered in all respects only illustrative and not restrictive. The scope of the present invention is indicated by the following claims rather than by the foregoing description. All changes that come within the meaning and range of equivalents are to be embraced within their scope.

We claim:

1. A control for use with a permanent magnet machine, comprising:

an algorithm for determining an open-loop magnetizing reference current;

a feedback path generating a feedback term based on the rotor speed of the permanent magnet machine and a torque current error;

a subtractor for subtracting the feedback term from the open loop magnetizing reference current to generate a total magnetizing reference current;

wherein the feedback path includes means for arithmetically combing rotor speed with a predetermined constant; and wherein the feedback path includes a multiplier for multiplying the arithmetically combined rotor speed by the torque current error.

2. The control of claim 1, further comprising:

a current controller outputting at least one phase control signal based on the magnetizing reference current.

3. The control of claim 1, wherein the feedback path includes a limiter for limiting the feedback term to a predetermined range.

4. The control of claim 3, wherein the limiter maintains a positive value for the feedback term.

5. The control of claim 1, wherein the open-loop magnetizing reference current is determined based on inductance saturation curves at peak torque points for the permanent magnet machine.

6. A method of generating a reference current for controlling a permanent magnet machine, comprising:

determining an open loop magnetizing reference current;

generating a feedback term based on the rotor speed of the permanent magnet machine and a torque current error;

subtracting the feedback term from the open-loop magnetizing reference current to generate the reference current; and determining the open loop magnetizing reference current based on inductance saturation curves at peak torque points for the permanent magnet machine.

7. The method of claim 6, further comprising:

limiting the feedback term to a predetermined range.

8. A controller, comprising:

a first software routine for determining a magnetizing reference current and a torque reference current based on one or more inductance saturation curves at peak torque points for a permanent magnet motor;

a second software routine for computing an output magnetizing reference current by subtracting from the magnetizing reference current a feedback term based on the rotor speed of the permanent magnet motor and a torque current error, the torque current error being the difference between the torque reference current and a feedback torque current from the permanent magnet motor; and a processor for executing the first and second software routines.

9. The controller of claim 8, further comprising:

a first current controller responsive to the output magnetizing reference current; and a second current controller responsive to the torque current error.

10. The controller of claim 9, further comprising:

a coordinate transform component for transforming the outputs of the first and second controllers from a rotating reference frame to a stationary reference frame.

11. The controller of claim 10, further comprising:

a space vector modulator generating inverter control signals in response to the output of the coordinate transform component.

12. The controller of claim 11, further comprising:

an inverter, operatively coupled to the SVM.

13. A method of generating a reference current for controlling a percent magnet machine, comprising:

determining an open loop magnetizing reference current;

generating a feedback term based on the rotor speed of the permanent magnet machine and a torque cut error;

subtracting the feedback term from the open-loop magnetizing reference current to generate the reference current;

combining the rotor speed with a predetermined constant; and multiplying the arithmetically combined rotor speed and predetermined constant by the torque current error.

* * * * *